United States Patent [19]

Jones

[11] Patent Number: 5,403,146

[45] Date of Patent: Apr. 4, 1995

[54] APPARATUS FOR MANIPULATING A WORKPIECE IN A MACHINING OPERATION

[75] Inventor: Joel W. Jones, Windsor, Canada

[73] Assignee: Triway Machine Ltd., Windsor, Canada

[21] Appl. No.: 62,750

[22] Filed: May 18, 1993

[51] Int. Cl.⁶ .............................................. B25J 15/08
[52] U.S. Cl. .................................. 414/783; 74/89.17; 74/490.1; 414/729; 414/758; 414/782
[58] Field of Search ............... 414/749, 751, 757, 778, 414/779, 782, 783, 729, 740, 758; 74/89.17, 479 PP

[56] References Cited

U.S. PATENT DOCUMENTS

| | | | |
|---|---|---|---|
| 2,627,335 | 2/1953 | Gedris | 414/783 X |
| 2,815,867 | 12/1957 | Ewaldson et al. | 414/783 X |
| 3,734,328 | 5/1973 | Dalglish | 414/783 X |
| 5,207,111 | 5/1993 | Trenner | 74/89.17 |

FOREIGN PATENT DOCUMENTS 0295774 11/1989 Japan .................................. 414/783

Primary Examiner—Donald W. Underwood
Attorney, Agent, or Firm—Shoemaker and Mattare, Ltd.

[57] ABSTRACT

An apparatus for rotating a workpiece in a machining operation, the workpiece having internal passageways, includes a stationary support, a carriage mounted for reciprocation with respect to the support and a cylindrical shaft carried by the carriage and capable of rotary motion about its axis. A pinion gear is fixed to one end of the shaft and meshes with a rack which reciprocates in a direction perpendicular to the direction of the shaft axis. A pin carrier block is fixed to the other end of the shaft, and supports a plurality of pin members adapted to register with the passageways of the workpiece when the carriage moves from one extremity of its travel to the other. Once the pin members are engaged, the rack moves along its path in order to rotate the shaft, and thus the workpiece, through 90° to prepare it for further machining operations.

6 Claims, 5 Drawing Sheets

APPARATUS FOR MANIPULATING A WORKPIECE IN A MACHINING OPERATION

This invention relates generally to an apparatus capable of manipulating a workpiece in a machining operation, and has to do more specifically with apparatus adapted to change the orientation of a workpiece from vertical to horizontal. A particular application of this apparatus is in the machining operations for bearing caps used in automotive engines, although it will be understood that this invention is not limited thereto.

BACKGROUND OF THIS INVENTION

The current method of making crankshaft bearing caps involves casting several caps (typically five) as an integral piece called a "monoblock". The monoblock passes through a broaching machine which rough machines the half-round joint faces and lock width pads. The ends of the monoblock and a "V" locating notch (for manufacturing purposes) are then milled. The various bearing cap holes are then drilled, whereupon the monoblock is sawed apart to produce a plurality (typically five) of bearing caps which have the finish width dimension.

The lock width of the bearing caps is then broached, and the individual bearing caps are spread apart.

The apparatus of the present invention, in accordance with one embodiment, is adapted to rotate the plurality of bearing caps through 90° into a "side faces down" position.

Subsequent to the rotation of the bearing caps, the bearing cap holes are finish reamed, and the lock notches are milled.

The foregoing steps produce finished parts, and each part is ready to be bolted to an engine block.

A crankshaft bearing cap of the kind under discussion has three critical locating surfaces, each perpendicular to the other two, and all of the them intersecting at one comer. The apparatus disclosed herein is adapted to rotate the bearing cap (or several at a time) about the line of intersection of two of these planes, while retaining the third surface in its own plane. The third surface just mentioned is the joint face between the bearing cap and the cylinder block to which it is affixed.

There are several advantages arising from the rotation of the thrust face of the bearing cap from a vertical plane to a horizontal plane. For example, with the thrust face now parallel to the plane of the floor, it is possible to improve the accuracy of the location of the bolt holes with respect to this thrust face. Moreover, this position of the bearing cap also lends itself to maintaining the improved accuracy for a longer period of time, thus resulting in an improvement in part quality and reduced scrappage.

GENERAL DESCRIPTION OF THIS INVENTION

In view of the foregoing comments, this invention provides an apparatus for rotating a workpiece in a machining operation, the workpiece having a plurality of parallel internal passageways, said apparatus comprising:

a stationary support means,
guide means fixed to the support means,
carriage means mounted for reciprocating movement along the guide means with respect to the support means,
first power means for moving the carriage means along the guide means,
at least one shaft having two ends and being mounted on the carriage means for rotary motion about an axis fixed with respect to the carriage means, said at least one shaft being restrained against axial movement with respect to the carriage means, said axis being parallel with the direction of movement of the carriage means,
a pinion gear member coaxially fixed to one end of the shaft to rotate therewith,
a rack bar mounted on the carriage means for reciprocating movement in a direction perpendicular to the direction of the shaft axis,
second power means for causing the rack bar to reciprocate,
a gear rack mounted to the rack bar for movement therewith, the gear rack having gear teeth meshing with the teeth of said pinion gear member, whereby when the second power means moves the rack bar with respect to the carriage means, the shaft rotates,
a carrier block fixed to the other end of the shaft to rotate therewith,
a plurality of pin members supported on said carrier block and projecting parallel with the direction of said axis, the pin members being spatially disposed such that they can register with the internal passageways in a workpiece, and
support rail means for guiding a workpiece into a position in which the pin means can register in said internal passageways, whereupon movement of said rack bar can rotate the shaft and hence the workpiece about said axis.

GENERAL DESCRIPTION OF THE DRAWINGS

One embodiment of this invention is illustrated in the accompanying drawings, in which like numerals denote like parts throughout the several views, and in which.

DETAILED DESCRIPTION OF THE DRAWINGS

Figure 1:
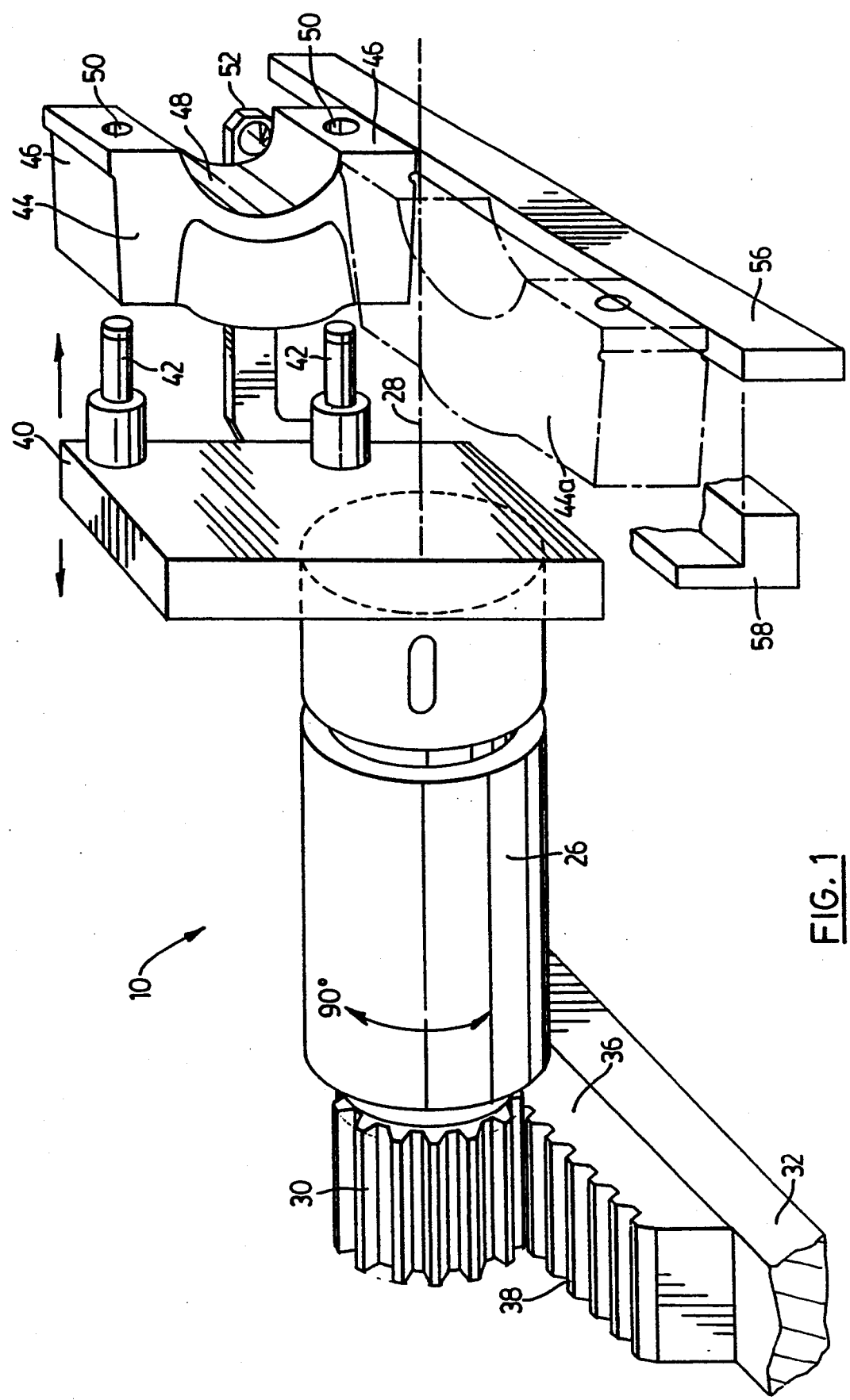
FIG. 1 is a somewhat schematic, perspective view showing the major components of the apparatus of this invention.
Figure 2:
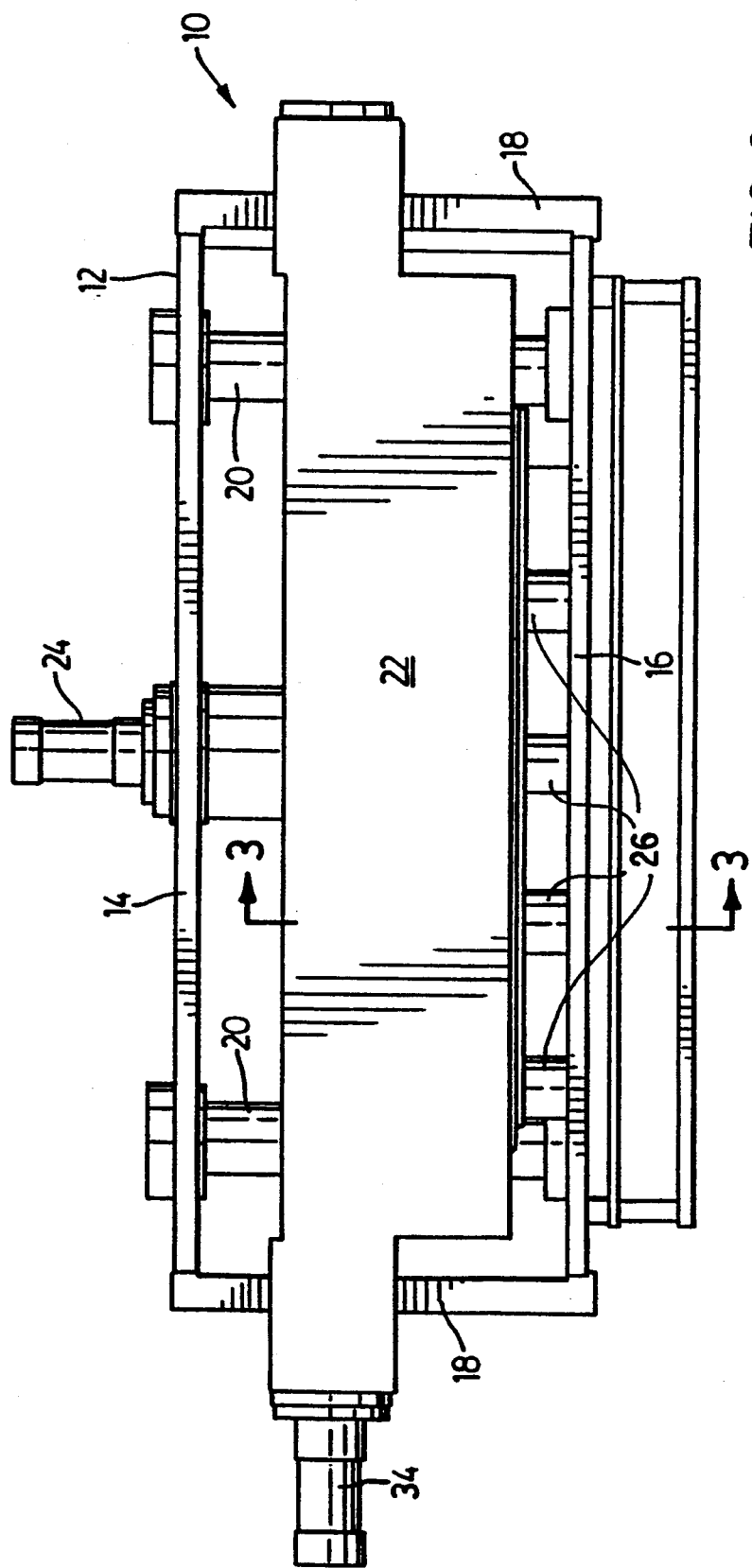
FIG. 2 is a plan view of the apparatus of this invention.
Figure 3:
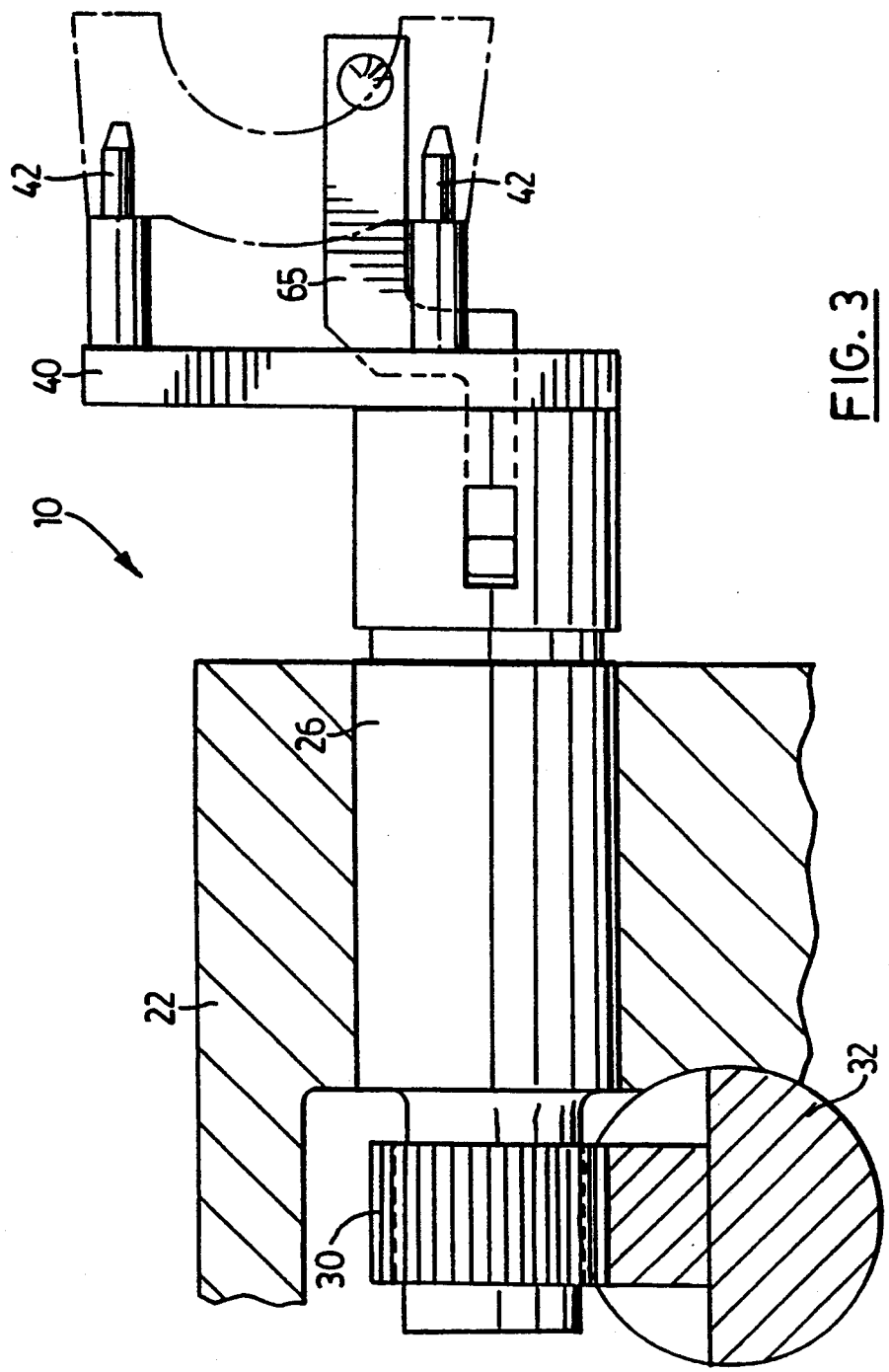
FIG. 3 is a partial sectional view taken along the line 3—3 in FIG. 2.

Looking first at FIGS. 1, 2 and 3, an apparatus 10 in accordance with this invention includes a stationary support 12 formed by an upstanding rear wall 14, an upstanding forward wall 16, and end braces 18. Fixed to the stationary support 12 are two cylindrical guide bars 20 extending between the upstanding rear wall 14 and the upstanding forward wall 16.

Mounted for reciprocating movement along the guide bars 20 is a carriage 22, and a hydraulic cylinder 24 is provided for moving the carriage 22 along the guide bars 20.

Mounted within the carriage 22 are a plurality of cylindrical shafts 26 each having two ends, and each being mounted to the carriage for rotary motion about a respective axis 28 which is fixed with respect to the carriage 22 and is parallel with the direction of reciprocating movement of the carriage 22. Each shaft 26 is restrained against axial movement with respect to the carriage means 22.

As best seen in FIGS. 1 and 3, a pinion gear member 30 is coaxially fixed to the left end of the shaft 26, and rotates therewith. If desired, the pinion gear member 30 could be integral with the remainder of the shaft 26.

A rack bar 32 is mounted within the carriage 22 for reciprocating movement in a direction perpendicular to the direction of the axes 28 of the shafts 26, and a further hydraulic cylinder device 34 (FIG. 2) is provided for causing the rack bar 32 to reciprocate with respect to the carriage 22.

As best seen in FIG. 1, a gear rack 36 (for each shaft 26) is securely mounted on the rack bar 32 for movement therewith. The gear rack 36 has gear teeth 38 meshing with the teeth of the pinon gear member 30, whereby when the hydraulic cylinder 34 causes the rack bar 32 to move with respect to the carriage 22, all of the shafts 26 rotate. All gear racks 36 are identical, as are the pinion gears 30. Because all gear racks 36 are mounted on the same rack bar 32, it will be appreciated that the various shafts 26 all turn in unison as the rack bar 32 is moved along its path.

Figure 5:
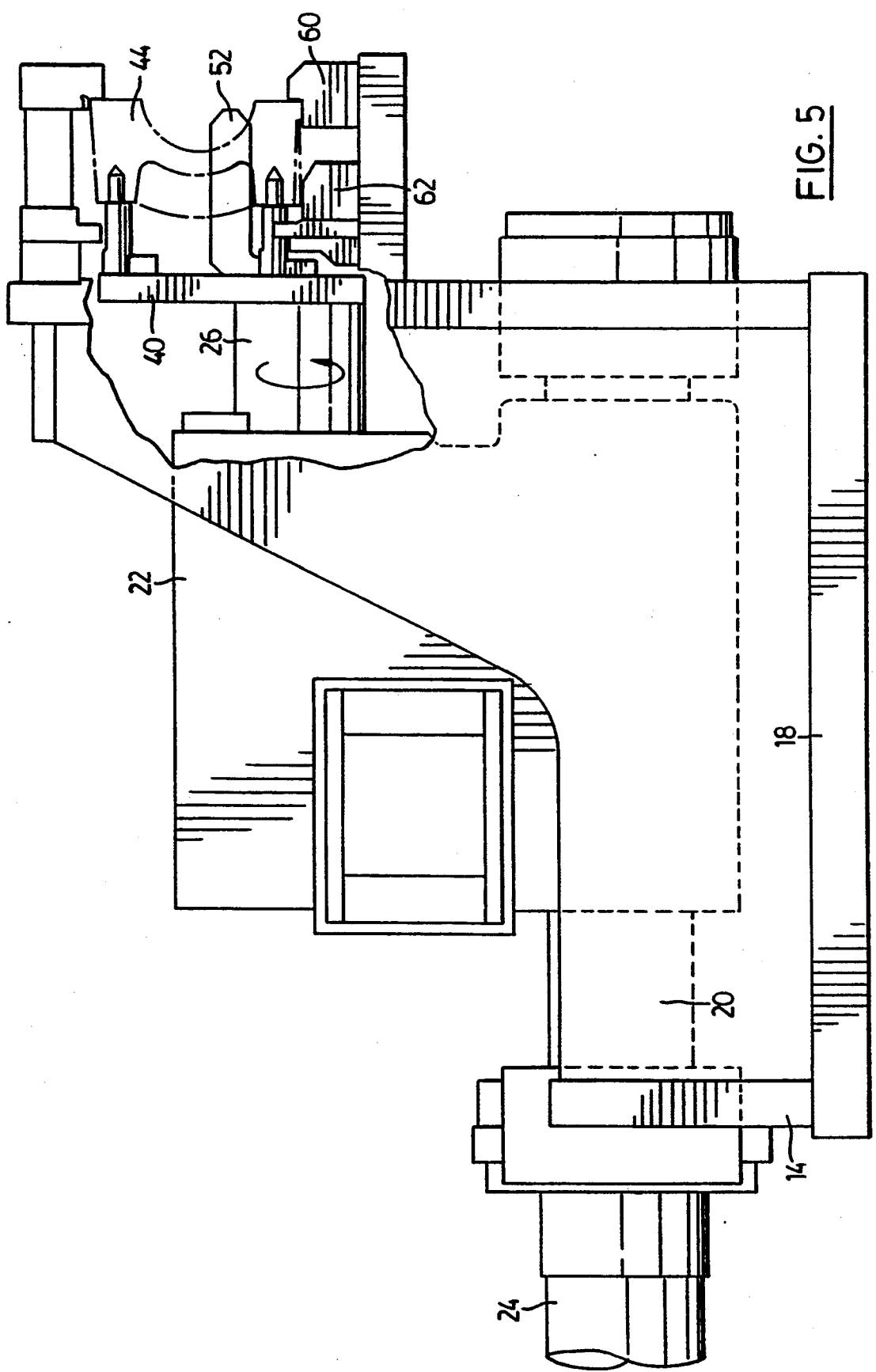
FIG. 5 is a partly broken-away end elevation of the apparatus of this invention.

Turning now to FIGS. 1, 3 and 5, a carrier block 40 is fixed to the rightward end of each shaft 26 for rotation therewith. Projecting rightwardly from the carrier block, in parallel with the axis 28, are a plurality of pin members 42 (two such pin members in this embodiment), and the pin members are securely supported from the respective carrier block 40.

Shown in FIG. 1 is a workpiece 44 in the form of a bearing cap having two end regions 46, and a bridging structure 48 integral with the end regions 46. Located in each end region 46 is a rough-drilled beating cap hole 50. The pins 42 are sized to enter the holes 50 with the bearing cap 44 initially in the vertical position as seen in FIG. 1.

A trapping finger 52 (subsequently to be described in detail) has an end portion which is resiliently biased in the horizontal plane toward the pin members 42, such that, when the pin members 42 are in position within the holes of the workpiece 44 (bearing cap), the trapping finger 52 secures the workpiece in place on the pin members 42. The trapping finger 52 is mounted to the carrier block 40, and thus rotates along with the carrier block.

FIG. 1 shows the bearing cap 44 in solid lines in its initial position, and shows the same beating cap in broken lines at 44a, after rotation through 90°.

FIG. 1 aim shows support rails 56 and 58 for guiding the workpiece (beating cap) 44 into a position in which pin members 42 can register in the holes 50. The cross-sections of the support rails 56 and 58 can be seen in FIG. 1.

In the slight variant shown in FIG. 5, the support rails 60 and 62 have a different cross-section. Nonetheless, the function of the support rails is the same for both variants.

Figure 4:
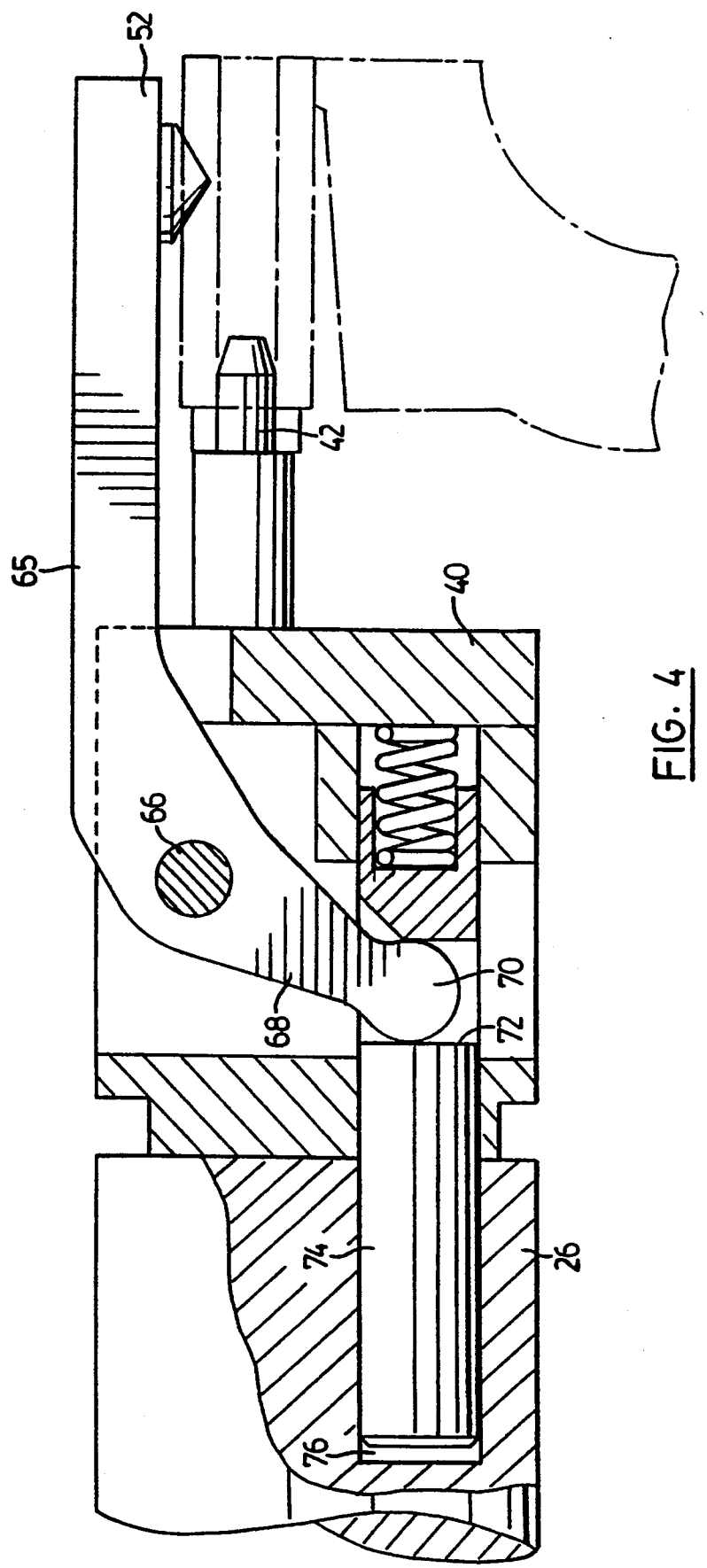
FIG. 4 is a somewhat schematic, partly sectional view of a portion of the apparatus providing biasing means.

Attention is now directed to FIG. 4, which shows the biasing and support mechanism for the trapping finger 52. It will be seen that the trapping finger 52 is actually one end of a dogleg member 65 which is mounted to the carrier block 40 about a pivot axis 66. The dogleg member 65 includes an angulated arm 68 having a head portion 70 which is captive within a recess 72 in a bar 74 adapted to reciprocate at least partly within a recess 76 in the shaft 26. The structure is such that, when the bar 74 moves in one direction, the trapping finger 52 moves toward the respective pin members 42. As seen in FIG. 3, the dogleg member 65 undergoes a step when viewed in side elevation.

While one embodiment of this invention has been illustrated in the accompanying drawings and described hereinabove, it will be evident to those skilled in the art that changes and modifications may be made therein, without departing from the essence of this invention, as set forth in the appended claims.

The embodiments of the invention in which an exclusive property or privilege is claimed are defined as follows:

1. An apparatus for rotating a workpiece in a machining operation, the workpiece having a plurality of parallel internal passageways, said apparatus comprising:
   a stationary support means,
   guide means fixed to the support means,
   carriage means mounted for reciprocating movement along the guide means with respect to the support means,
   first power means for moving the carriage means along the guide means,
   at least one shaft having two ends and being mounted on the carriage means for rotary motion about an axis fixed with respect to the carriage means, said at least one shaft being restrained against axial movement with respect to the carriage means, said axis being parallel with the direction of movement of the carriage means,
   a pinion gear member coaxially fixed to one end of the shaft to rotate therewith,
   a rack bar mounted on the carriage means for reciprocating movement in a direction perpendicular to the direction of the shaft axis,
   second power means for causing the rack bar to reciprocate,
   a gear rack mounted to the rack bar for movement therewith, the gear rack having gear teeth meshing with the teeth of said pinion gear member, whereby when the second power means moves the rack bar with respect to the carriage means, the shaft rotates,
   a carrier block fixed to the other end of the shaft to rotate therewith,
   a plurality of pin members supported on said carrier block and projecting parallel with the direction of said axis, the pin members being spatially disposed such that they can register with the internal passageways in a workpiece,
   support rail means for guiding a workpiece into a position in which the pin means can register in said internal passageways, whereupon movement of said rack bar can rotate the shaft and hence the workpiece about said axis, and trapping means carried by said carriage means for trapping a workpiece against said pin members.

2. The apparatus claimed in claim 1, in which said trapping means is a trapping finger mounted to said carriage block and movable toward and away from the pin members, the trapping finger being resiliently biased toward said pin members.

3. The apparatus claimed in claim 1, having a plurality of said shafts, each with a pinion gear member meshing with a separate gear rack, all said gear racks being mounted on the same rack bar for simultaneous movement, and each shaft having a carrier block with pin members, as defined.

4. The apparatus claimed in claim 3, further comprising a trapping finger for each shaft, each trapping finger being mounted to said carriage means and movable toward and away from the respective pin members in a direction substantially parallel with the reciprocation direction of the rack bar, the trapping finger being resiliently biased toward the respective pin members.

5. The apparatus claimed in claim 2, in which said trapping finger is provided by a dogleg member mounted to said carriage means for pivoting motion about an axis perpendicular to both the direction of rack bar reciprocation and the axis of the shaft, the dogleg member having a portion captive within a recess in a reciprocating bar, the bar being resiliently biased in a given direction which is such that, when the bar moves in said given direction, the trapping finger moves toward said pin members.

6. The apparatus claimed in claim 4, in which each said trapping finger is provided by a separate dogleg member mounted to said carriage means for pivoting motion about an axis perpendicular to both the direction of rack bar reciprocation and the axis of the shaft, each dogleg member having a portion captive within a recess in a separate reciprocating bar, each bar being resiliently biased in a given direction which is such that, when the bar moves in said given direction, the respective trapping finger moves toward the respective pin members.

* * * * *

UNITED STATES PATENT AND TRADEMARK OFFICE
CERTIFICATE OF CORRECTION

PATENT NO. : 5,403,146
DATED      : April 4, 1995
INVENTOR(S): Joel W. JONES

It is certified that error appears in the above-identified patent and that said Letters Patent is hereby corrected as shown below:

Column 1, line 40, "comer" should read --corner--.

Column 3, lines 51 and 54, "beating" should read --bearing--.

Column 3, line 53, "aim" should read --also--.

Signed and Sealed this

Twenty-fifth Day of July, 1995

Attest:

BRUCE LEHMAN

Attesting Officer    Commissioner of Patents and Trademarks